US012627113B2

(12) United States Patent
Payne et al.

(10) Patent No.: US 12,627,113 B2
(45) Date of Patent: May 12, 2026

(54) OPTICAL AMPLIFIER

(71) Applicant: Lawrence Livermore National Security, LLC, Livermore, CA (US)

(72) Inventors: Stephen Anthony Payne, Castro Valley, CA (US); Raymond Beach, Livermore, CA (US); Jean-Michel Di Nicola, Livermore, CA (US); Alvin Erlandson, Livermore, CA (US); John Heebner, San Ramon, CA (US); Jeremy Lusk, Livermore, CA (US); William A. Molander, Livermore, CA (US); Samuel Edward Schrauth, Livermore, CA (US); Jen Nan Wong, Fremont, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1018 days.

(21) Appl. No.: 17/687,467

(22) Filed: Mar. 4, 2022

(65) Prior Publication Data

US 2023/0283036 A1 Sep. 7, 2023

(51) Int. Cl.
*H01S 3/00* (2006.01)
*H01S 3/06* (2006.01)
(Continued)

(52) U.S. Cl.
CPC ...... *H01S 3/094038* (2013.01); *H01S 3/0606* (2013.01); *H01S 3/08059* (2013.01);
(Continued)

(58) Field of Classification Search
CPC ............ H01S 3/094038; H01S 3/0606; H01S 3/08059; H01S 3/1611; H01S 3/165; H01S 2301/02
See application file for complete search history.

(56) References Cited

U.S. PATENT DOCUMENTS 3,942,127 A 3/1976 Fluhr et al.
4,489,036 A * 12/1984 Jamrus .................... G21C 7/16 376/229

(Continued)

FOREIGN PATENT DOCUMENTS

GB 2008312 A * 5/1979 .............. H01S 3/06

OTHER PUBLICATIONS

Kweon et al., "Aspherical Lens Design by Using a Numerical Analysis," Journal of the Korean Physical Society, vol. 51, No. 1, Jul. 2007, pp. 93-103.

(Continued)

*Primary Examiner* — Mark Hellner
(74) *Attorney, Agent, or Firm* — Knobbe, Martens, Olson & Bear, LLP

(57) ABSTRACT

An optical amplifier comprises a gain medium having an input surface and an output surface wherein the output surface is larger than the input surface. The gain medium may be frustum shaped. The optical amplifier includes a negative diverging lens to receive an extraction laser beam and to cause the laser beam to expand as the beam passes through the gain medium. The amplifier further comprises a positive collimating lens configured to receive the expanding amplified beam and reduce the divergence. The gain medium can be pumped by counter-propagating radiation. The fluence of the laser beam within the gain medium is configured to be near constant along the length of the gain medium and may be within 1.5-2.0 $F_{SAT}$. The gain medium may be doped with dopant to provide gain, with larger concentration of dopants proximal the input surface and smaller concentration proximal the output surface.

20 Claims, 8 Drawing Sheets

(51) Int. Cl.
*H01S 3/08* (2023.01)
*H01S 3/094* (2006.01)
*H01S 3/16* (2006.01)

(52) U.S. Cl.
CPC ............ *H01S 3/1611* (2013.01); *H01S 3/165* (2013.01); *H01S 2301/02* (2013.01)

(56) References Cited

U.S. PATENT DOCUMENTS

| | | | | |
|---|---|---|---|---|
| 4,987,575 | A * | 1/1991 | Alfano | H01S 3/16 372/39 |
| 5,539,571 | A | 7/1996 | Welch et al. | |
| 6,118,802 | A | 9/2000 | Sanders et al. | |
| 9,477,135 | B1 | 10/2016 | Uyeno et al. | |
| 2013/0301117 | A1 * | 11/2013 | Zapata | H01S 3/06 359/342 |
| 2014/0153595 | A1 * | 6/2014 | Nakai | H01S 3/10084 372/6 |
| 2015/0055210 | A1 * | 2/2015 | Gapontsev | H01S 3/094042 359/341.3 |
| 2017/0353000 | A1 * | 12/2017 | Cohen | G02F 1/3501 |
| 2019/0103724 | A1 | 4/2019 | Onose et al. | |

OTHER PUBLICATIONS

International Search Report and Written Opinion dated Jun. 26, 2023 in Application No. PCT/US2023/063592 in 10 pages.

* cited by examiner

OPTICAL AMPLIFIER

FEDERALLY SPONSORED RESEARCH OR DEVELOPMENT

This invention was made with Government support under Contract No. DE-AC52-07NA27344 awarded by the United States Department of Energy. The Government has certain rights in the invention.

BACKGROUND

Field

The present disclosure relates generally to optical amplifiers, gain media and extraction of stored energy from gain media, and more specifically to gain media configured to accommodate an expanding laser beam as well as systems and methods related thereto.

Description of the Related Art

A laser beam 10 from as laser 12 can be amplified by transmitting the laser beam through a gain medium 14 to produce an amplified laser beam 16 such as shown in FIG. 1, which depicts an optical amplifier 5 for amplifying a laser beam. Pump radiation 18 from a pump source 20 may be used to energize the gain medium 14, which can store large amounts of energy that is extracted by the laser beam 10 as the laser beam propagates through the gain medium. Designs and methods for efficient extraction of energy from the gain medium 14 can be desirable.

SUMMARY

The present disclosure relates generally to methods and apparatus for more efficiently extracting optical energy from a gain medium and imparting such optical energy into a laser beam propagating through the gain medium. Various devices, systems, and methods described herein utilize a gain medium having lateral dimensions as well as a transverse gain profile that increase along the length of the gain medium. Such a gain medium may, for example, comprise a material configured to provide optical gain having the shape of a frustum with an input surface or face and an output surface or face wherein the output is larger in area than the input.

For example, in one design, an optical amplifier comprises a first lens configured to receive a laser beam and output an expanding beam and a gain medium comprising material configured to provide optical gain to laser light transmitted therethrough. The gain medium has an input surface and an output surface separated from each other in a longitudinal direction. The input surface extends in first and second directions orthogonal to the longitudinal direction so as to have an input area. The output surface also extends in the first and second directions orthogonal to the longitudinal direction so as to have an output area. The output area of the output surface of the gain medium is larger in both the first and second directions than the input area. The gain medium is positioned to receive the expanding beam of light into said input surface and to output said expanding beam through said output surface. The expanding beam also has a larger beam size in both the first and second directions at the output surface than at the input surface. The optical amplifier further comprises an optical pump source configured to provide output pump radiation to the gain medium such that the optical material provides optical gain to the expanding beam transmitted therethrough.

Also disclosed herein is an optical amplifier comprising a gain medium comprising material configured to provide optical gain to laser light transmitted therethrough. The gain medium has an input surface and an output surface separated from each other in a longitudinal direction. The input surface extends in first and second directions orthogonal to the longitudinal direction so as to have an input area. The output surface also extends in the first and second directions orthogonal to the longitudinal direction so as to have an output area. The output area is larger in both the first and second directions than the input area.

The present disclosure may be used in amplification systems and high power laser systems possibly to provide system performance advantages.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

FIG. 3A also includes a plot on axes of gain coefficient, g, (in $cm^{-1}$) and length (in cm) that show the decrease of the gain coefficient along the length of the gain medium. The gain coefficient is higher at an input end of the gain medium where a counter-propagating pump beam has been attenuated due to propagation through and absorption by the gain medium.

FIG. 3B also includes a plot on axes of fluence (in $J/cm^2$) and length (in cm) that shows a substantial constant fluence along the length of the gain medium. The near constant fluence of the laser beam within the gain element results at least in part from compensation of the effect of the expansion of the laser beam, which contributions to reduction in the fluence, by the progressive transfer of optical energy from the gain medium to the laser beam as the laser beam propagate through the length of the gain medium, which contributes to an increase in the fluence.

FIG. 4A shows a pump beam propagating in the opposite direction from the output to the input. FIG. 4A also shows a plot on axes of dopant level (in units of Nd/Sr or Neodymium ions per strontium ion) and distance from the input (in cm) depicting a reduction in dopant level along the length of the gain medium from the input to the output.

FIG. 4B shows a pump beam propagating in the opposite direction from the output to the input. FIG. 4B also shows a plot on axes of dopant level (in units of Nd/Sr for the case of Nd-doped $SrF_2$) and distance from the input (in cm) depicting a first higher dopant level in a section of the gain medium closer to the input and a second lower dopant level in a section of the gain medium closer to the output.

DETAILED DESCRIPTION

Figure 1:
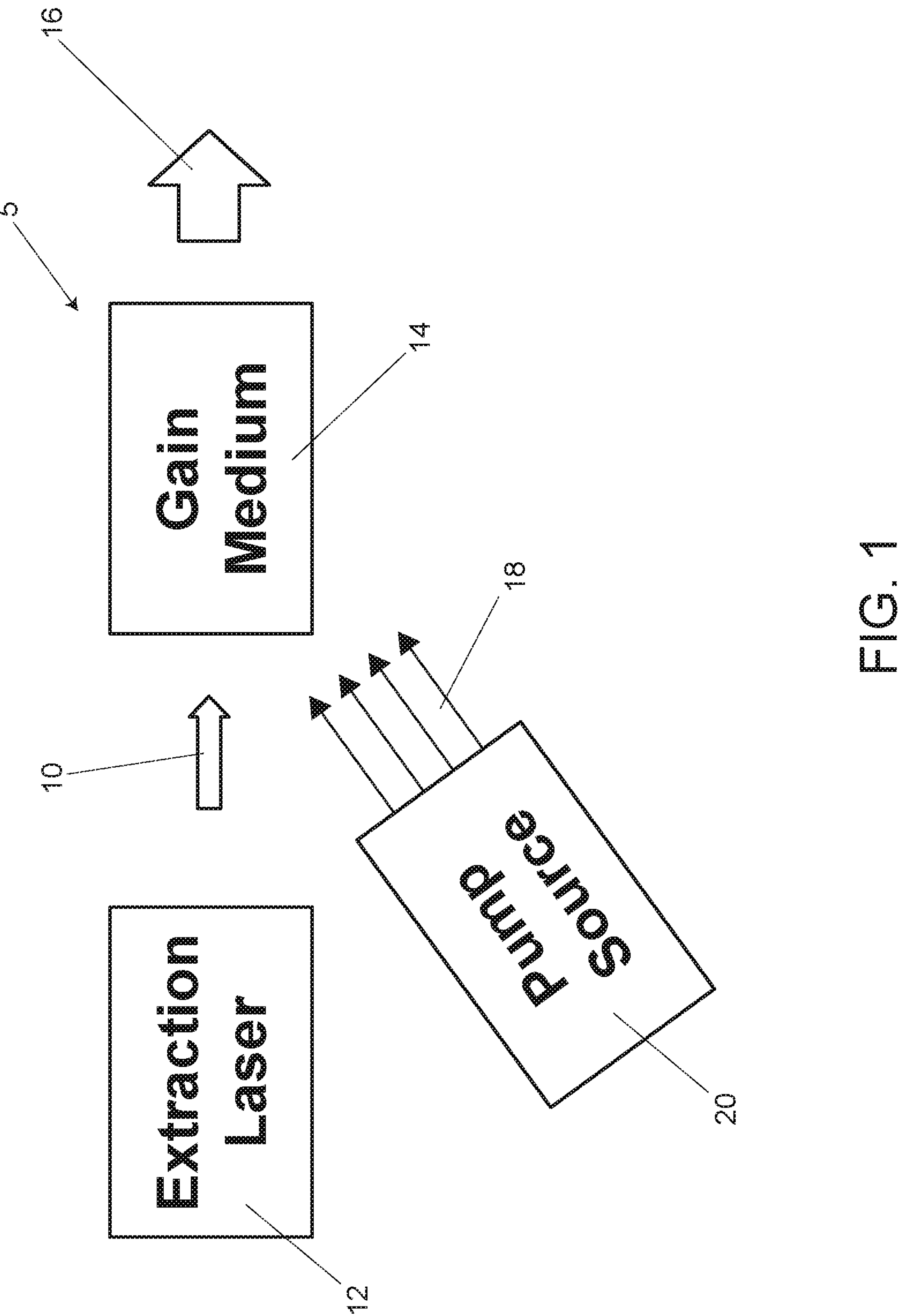
FIG. 1 is a schematic view of an example optical amplifier for amplifying a laser beam.

For some laser applications, it is desirable to store large amounts of energy in a gain medium 14 and extract this energy efficiently, e.g., in a laser pulse, as depicted in FIG. 1. As discussed above, a laser beam 10 from a laser 12 can be amplified in an optical amplifier 5 comprising a gain medium 14 and a pump source 20 by transmitting the laser beam through the gain medium. The laser 12 may be a pulsed laser producing a pulsed laser beam or may be a continuous wave (CW) laser producing a CW laser beam. Pump radiation 18 from a pump source 20 may be used to energize the gain medium 14, which can store large amounts of energy that is transferred to the laser beam 10 as the laser beam propagates through the gain medium. The laser beam 10 may effectively extract optical energy stored in the gain medium 14 as the extraction laser beam passes through the gain medium, which has been pumped via the pump radiation 18. An amplified laser beam 16 and/or high energy pulses can thereby be produced. See, for example, FIG. 1. Accordingly, as the laser beam 10 propagates through the gain medium 14, the energy of the beam increases. This increase in energy can be characterized by fluence, which is energy per unit area (e.g., $J/cm^2$). In various pulsed optical amplifiers 5, therefore, the fluence increases with distance along the length of the gain medium 14. For some high powered lasers 12, the increase of the optical energy of the laser beam 10 can have deleterious effects such as the formation of hot spots and damage to the gain medium 14, e.g., at defects in the gain medium that absorb too much light.

Figure 2:
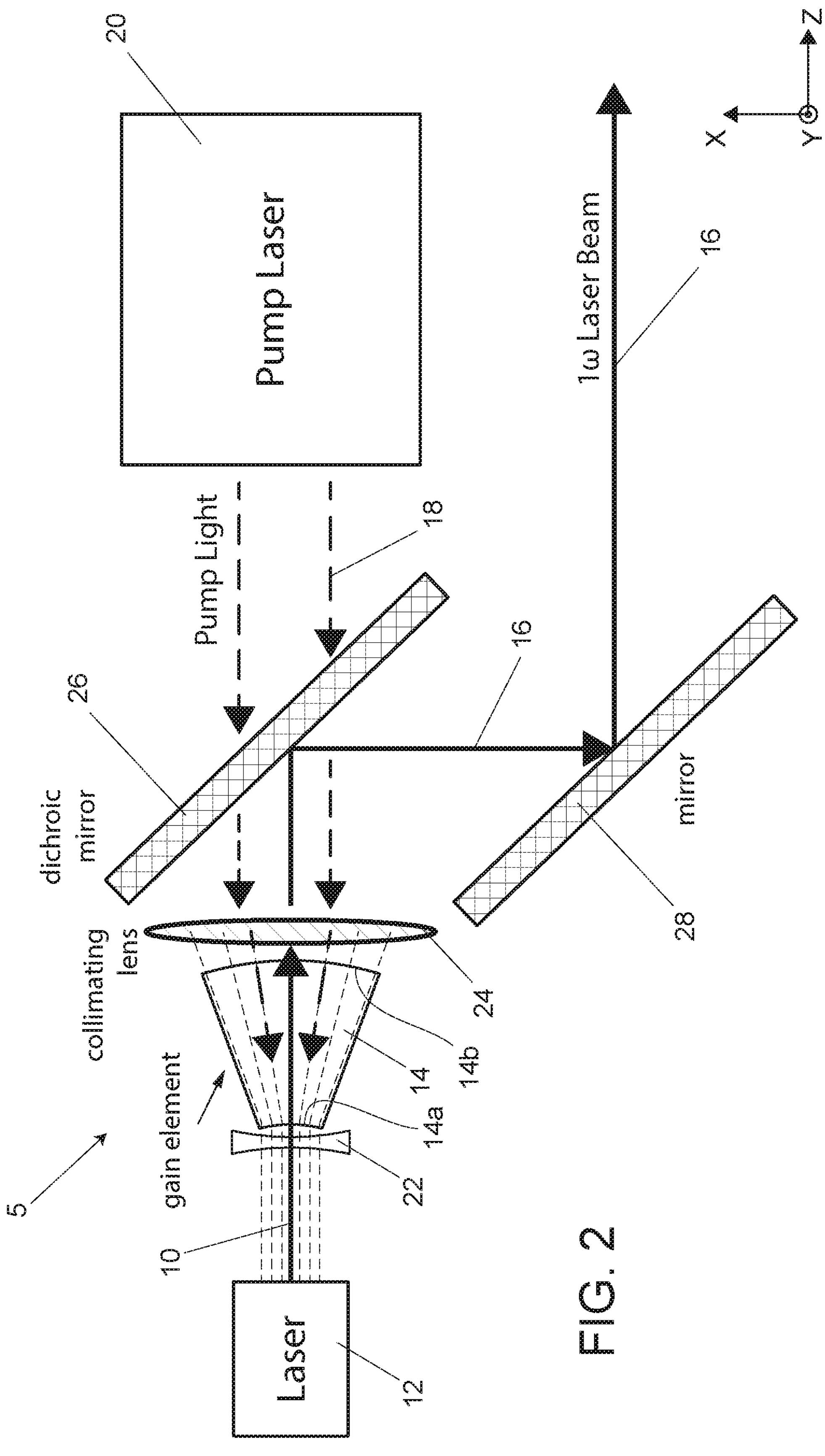
FIG. 2 is a schematic view of an example optical amplifier comprising a gain medium that transmits a laser beam therethrough that is to be amplified. A negative lens causes the laser beam to expand or diverge as the laser beam propagates through the gain medium disposed downstream of the negative lens. The gain medium and a transverse gain profile therein increases in cross-sectional area with distance along the length thereof in conjunction with the expansion or divergence of the laser beam. In the design shown, the gain medium is optically pumped by a pump beam that is counter-propagating with respect to the laser beam that is being amplified.

Various optical amplifiers 5 described herein counter this increase in fluence and potentially reduce the occurrence of such optical damage by utilizing a gain medium 14 having a cross-sectional area orthogonal to the length of the gain medium that increases along the length of the gain medium as illustrated in FIG. 2. In the example shown in FIG. 2, the optical amplifier 5 comprises negative power optics 22 in an optical path of the laser beam 10 that is to be amplified. In the example, the negative power optics 22 is positioned in an optical path between the gain medium 14 and the laser 12 that outputs the laser beam 10 to be amplified. The negative power optics 22, having negative power, is configured to cause the laser beam 10 to expand. The negative power optics 22 may comprise a diverging lens such as a negative lens having negative optical power as shown in FIG. 2. This negative lens 22 is depicted in FIG. 2 as a bi-concave lens, however other types of lenses including plano concave or diffractive or holographic lenses may be employed. Similarly, negative power mirrors such as concave mirrors as well as negative power reflective diffractive or holographic optical elements can be used. The negative optics 22 is shown receiving a collimated beam 10 from the laser 12 and producing an expanding beam that continues through the gain medium 14. In various implementations, this expanding beam 10 comprises a spherically diverging beam comprising spherical waves or spherical wavefronts. Accordingly, in various designs, the negative power optics 22 is rotationally symmetric, e.g., about a longitudinal axis and/or an optical axis.

Positive power optics 24 are included in the optical path of the laser beam 10 that is shown in FIG. 2 as diverging upon being incident on the positive power optics 24. As illustrated, the gain medium 14 is positioned in the optical path between the negative power optics 22 and the positive power optics 24. The positive power optics 24 thus receives the expanding laser beam 16 after having passed through the gain medium 14. The positive power optics 24, having positive optical power, reduces the divergence of the expanding laser beam 10. In the example shown, the positive power optics 24 collimates the expanding laser beam 10. Accordingly, in various implementations, the positive power optics 24 comprises collimating optics.

The positive power optics 24 may comprise a converging lens or a positive lens having positive optical power as shown in FIG. 2. This positive power optics 24 is depicted in FIG. 2 as a bi-convex lens, however, other types of lenses including plano-convex or diffractive or holographic lenses may be employed. Similarly, positive power mirrors such as concave mirrors as well as positive power reflective diffractive or holographic optical elements can be used. Light output from the gain medium 14 is amplified thereby producing an amplified beam 16 that is incident on the positive power optics 24. As discussed above, this amplified beam 16 may be collimated by the positive power optics 24 and may thus comprise a collimated beam. Likewise, in various implementations, the positive power optics 24 receives spherical waves or wavefronts and outputs planar waves or wavefronts. Accordingly, in various designs, the positive power optics 24 is rotationally symmetric, e.g., about a longitudinal axis and/or an optical axis.

Various implementations of the optical amplifier 5, for example, comprising the negative diverging lens 22 and the positive collimating lenes 24 can essentially be regarded as a classical Galilean telescope with the gain medium introduced in between the negative and positive lenses. Accordingly, this configuration may be referred to herein as a "Galilean Optical Amplifier".

In the example design shown in FIG. 2, the amplified beam 16 is incident on a dichroic mirror 26. The dichroic mirror 26 is configured to couple 18 pump radiation from the pump source 20 into the gain medium 14 while permitting the amplified laser beam 16 to be coupled out of the gain medium. For example, the dichroic mirror 26 may reflect light having a wavelength or wavelengths of the amplified laser beam 16 and transmit light having a wavelength or wavelengths of the pump radiation 18 and/or pump source 20. In other examples, the dichroic mirror 26 may reflect light having a wavelength or wavelengths of the pump radiation 18 and/or pump source 20 and transmit light having a wavelength or wavelengths of the amplified laser beam 16. In the configuration shown, the positive power optics 24 is in the optical path between the gain medium 14 and the dichroic mirror 26. The dichroic mirror 26 thus receives the laser beam 16 amplified and having divergence reduced or collimated by the positive power optics. The dichroic mirror 26 facilitates coupling of the pump radiation 18 into the gain medium 14 in a manner such that the amplified laser beam 16 and the pump radiation are counter-propagating passing through the gain medium, propagating in opposite directions. Similarly, the input laser beam 10 that is directed into the gain medium 14 and the pump radiation 18 are counter-propagating passing through the gain medium in opposite directions. Although a dichroic mirror 28 is shown as coupling the pump radiation 18 into the gain medium 14, other types of optical elements and/or configurations may be used.

The example configuration shown in FIG. 2 further includes a reflector or mirror 28 in the optical path of the amplified laser beam 16 to redirect the laser beam in a suitable direction. In the example shown, the dichroic mirror 26 is in an optical path between the positive optics 24 and the reflector 28. Likewise, one or more reflective optical elements may optionally be included in the optical amplifier 5 or upstream (e.g., between the laser source 12 and the negative optics 22) or downstream (e.g., after the dichroic mirror 26) to redirect the beam as desired. Additionally, one or more optical elements may optionally be included in the path(s) of the laser beam input to the gain medium 14 and/or the amplified laser beam 16 and/or the pump radiation 18 or elsewhere.

The pump source 18 may comprise one or more lasers or other light sources. In some implementations, the pump source comprises, for example, one or more chromium lasers. Diode arrays may also be used in various implementations.

In various implementations, the gain medium 14 shown in FIG. 2 comprises a gain medium having lateral dimensions that increase along the length of the gain medium. The gain medium has an input surface or face 14*a* and an output surface or face 14*b* separated from each other in a longitudinal direction (e.g., parallel to the z-axis in the xyz coordinate system shown in the lower right of FIG. 2). This longitudinal direction may correspond to an optical axis in certain cases. The input surface 14*a* extends in first and second directions (e.g., parallel to the x-axis and y-axis, respectively, in the xyz coordinate system shown in the lower right of FIG. 2) that are orthogonal to the longitudinal direction and orthogonal to each other. The input surface 14*a* thus has an input area, for example, a surface area of the input surface or a projected area determined by the lateral extents in the first and second directions. The output surface 14*b* also extends in the first and second directions (e.g., parallel to the x-axis and y-axis, respectively, in the xyz coordinate system shown in the lower right of FIG. 2) that are orthogonal to the longitudinal direction and normal to each other. The output surface 14*a* thus has an output area, for example, the cross-sectional area of the beam determined by the lateral extents in the first and second direction and normal to the longitudinal direction. The output area of the output surface 14*b* of the gain medium is larger in both the first and second directions than the input area of the input surface 14*a*. The gain medium 14 is positioned to receive the expanding or diverging beam of light into said input surface 14*a* and to output said expanding beam through said output surface 14*b*. The expanding beam 10 also has a larger beam size in both the first and second directions (e.g., parallel to the x-axis and y-axis, respectively, in the xyz coordinate system shown in the lower right of FIG. 2) at the output surface 14*b* than at the input surface 14*a*.

The gain medium 14 has or comprises material configured to provide optical gain having sufficiently wide lateral extent, e.g., width and height along the first and second directions (e.g., parallel to the x-axis and y-axis, respectively, in the xyz coordinate system shown in the lower right of FIG. 2) orthogonal to the length of the gain medium such that the laser beam propagates within the gain medium via free-space propagation along the length of the gain medium as opposed to comprising a waveguide mode. The lateral dimensions of the gain medium or the material configured to provide optical gain at the input surface and at the output surface and therebetween may be over 1000 times the wavelength of the laser light comprising the laser beam 10. The lateral dimensions, for example, in the first and second directions orthogonal (e.g., parallel to the x-axis and y-axis, respectively, in the xyz coordinate system shown in the lower right of FIG. 2) to the longitudinal direction (e.g., which is parallel to the z-axis in the xyz coordinate system shown in the lower right of FIG. 2) as well as the length of the gain medium 14 or the material configured to provide optical gain in the longitudinal direction (e.g., parallel to the z-axis in the xyz coordinate system shown in the lower right of FIG. 2) may be 1 mm to 100 cm or possibly larger. The length and dimensions may be such that the powers of the first optic and/or the second optic has an f-number of f/10 to f/1.5, or about f/5 to about f/1.5, or f/5 to f/2, or about f/4 to about f/2. Accordingly, f-# may be such that the expansion of the beam laser is similar to or about the same as the expansion of the gain medium 14.

Such a gain medium may, for example, have the shape of or comprise material configured to provide optical gain having the shape of a frustum with an input and an output wherein the output is larger in area than the input. The frustum may comprise, for example, a truncated cone or truncated pyramid. A frustum such as a truncated cone may have a circular cross-section orthogonal to the length of the frustum. A frustum such as truncated pyramid may have a triangular, square, pentagonal, hexagonal, septagonal, octagonal, or other polygonal cross-section orthogonal to the length of the frustum. The cross-section orthogonal to the length of the gain medium frustum may have more than 8 sides in some designs. Still other shapes are possible.

As shown, the input surface 14*a* and/or the output surface 14*b* may be curved. For example, the input surface 14*a* may be concave and the output surface 14*b* may be convex as depicted in FIG. 2. In some implementations, the input and/or output surfaces 14*a*, 14*b* of the amplifier are curved in order to reduce the magnitude of the optical aberration/distortion experienced by the spherically-diverging beam. Reduction of aberrations is thus possible in various designs. In some cases, the shape (e.g., amount of curvature) of the input surface 14*a* and/or output surface 14*b* may be configured to match or approximate the shape (e.g., amount of curvature) of the wavefront of the diverging laser beam at the location of the input surface 14*a* and/or output surface 14*b*, respectively. Likewise, the direction of the rays of light in the diverging beam 10 may be essentially parallel to the local normals of the input surface 14*a* and/or output surface 14*b*. Other amounts of curvatures, other curvatures as well as other shapes, however, are possible.

The material (e.g., host material) comprising the gain medium 14 may comprise glass, dielectric crystal (e.g., single crystal), or ceramic (e.g., transparent ceramic). In some cases, the material (e.g., host material) comprises strontium fluoride or other fluoride with the fluorite crystal structure. In some cases, the material (e.g., host material) comprises garnet such as possibly yttrium aluminum garnet (YAG), or comprises yttrium lithium fluoride (YLF). Other materials may possibly be used. In various implementations, the material (e.g., host material) comprising the gain medium 14 is not semiconductor and/or does not comprise an electrically pumped semiconductor or semiconductor configured to be electrically-pumped (e.g., using electrical contacts and/or conductive pathways).

The host material comprising the gain medium may be doped to provide optical gain. In some implementations, the dopant comprises a rare earth ion selected from the group of Ce, Pr, Nd, Pm, SmEu, Tb, Dy, Er, Tm, Ho, or Yb. In some implementations, the dopant comprises a transition metal selected from the group of Ti, V, Cr, Fe, Co, or Ni. Other ions and metals as well as other elements may possibly be used.

The gain medium employed for the amplifier may, for example, be based on Nd-doped or $Nd^{3+}$-doped host media, such as $Nd^{3+}$ in phosphate glass, $SrF_2$, YLF ($LiYF_4$), (YAG) $Y_3Al_5O_{12}$, and many other hosts. In various implementations, the hosts comprise oxides or fluorides. Other rare earth ions can furnish gain, such as for example, $Er^{3+}$, $Tm^{3+}$, and $Ho^{3+}$. Many transition metals, such as for example $Ti^{3+}$, can be employed as the laser ion. Other types of gain media that can benefit from the designs described herein.

In various implementations, the laser ions are pumped to achieve adequate gain in the host medium with manageable levels of loss and wavefront distortion in the gain elements. Nd-based gain media can be pumped by flashlamp-pumped chromium lasers such as Alexandrite, Cr:LiCAF and Cr:LiSAF. Other examples of pump sources are Ho-lasers pumped with Tm-fiber lasers, utilizing various types of diodes to pump the aforementioned rare earth ions, and pumping Ti:Sapphire with doubled Nd-lasers. In some cases, direct flashlamp-pumping is possible.

The efficiency at which energy is extracted from the gain medium 14 by the laser beam 10 can be increased when the input laser beam is set to a particular fluence, which can be described in units of Joules/$cm^2$. For various designs, if the extraction beam fluence is less than a certain value (e.g., the optimal fluence), the efficiency is lower, and energy is left behind in the gain medium. In contrast, if the extraction beam fluence is higher than this certain value of fluence (e.g., this optimal fluence), the efficiency falls due to passive losses in the gain medium (such as scatter from imperfections and absorption by unwanted impurities). Moreover, the highest usable fluence is often limited by the onset of optical damage and/or nonlinear optical distortions. Accordingly, for certain designs of optical amplifiers and, for any given condition or circumstance associated with the pumped gain media, the laser extraction fluence may be characterized by a value or values, possibly an optimal value or values, for operating at or near, that may provide benefits such as increased extraction efficiency. However, for many designs, the extracting laser beam 10 may operate at optimal fluence at primarily a single point along the path of the laser beam through the gain medium 14 as opposed to a range of locations. However, with various implementations described herein, the desired value or values of fluence that provides for increased extraction efficiency can occur throughout most of the length of the gain region, possibly at least 50%, 60%, 70%, 80%, 90%, 95%, or even potentially 100% of the length of the gain medium, or any range formed by any of these values.

Various designs described herein provide a near constant thence within the gain element 14. This constant or near constant fluence may be achieved in part by increasing the lateral dimensions of the gain medium 14 along the length of the gain medium and providing the gain medium with an expanding laser beam 10 to extract energy from the gain medium. The expansion of the laser beam 10, which decreases the fluence, is compensated by a special longitudinal gain profile that adds the desired amount of energy to the extraction beam to maintain approximate constancy of the fluence. Various implementations described herein thus allow a desired fluence level (e.g., the optimal fluece) of the extraction laser beam 10 throughout the length of the gain medium 14. Such designs may potentially allow the optical amplifier 5 to operate at increased efficiency, possibly even maximal or near maximal.

As referenced above, pursuing a constant or near constant fluence amplification can involve balancing between gain and fluence falloff due to beam expansion. A simple equation for fluence, F, of a beam undergoing amplification as well as expansion so as to increase the cross-sectional area orthogonal to the longitudinal direction of the beam is shown below, $$\frac{dF}{dz} = g(z)F - \frac{1}{A}\frac{dA}{dz}F$$

where g(z) is the gain as a function of position, z, along the length of the gain medium or along the longitudinal direction of the beam, and A is area. The second term accounts for the reduction of fluence due to areal expansion of the diverging beam with length. This equation can provide a method to determine a prescription for constant fluence. In particular, dF/dz can be set to 0 and the equation can be solved for g(z) to determine a desired gain profile. Other design approaches can also be used. In various implementations, a Frantz-Nodvik model, which is well-known to practitioners of the art, may be employed.

Figures 3A, 3B:
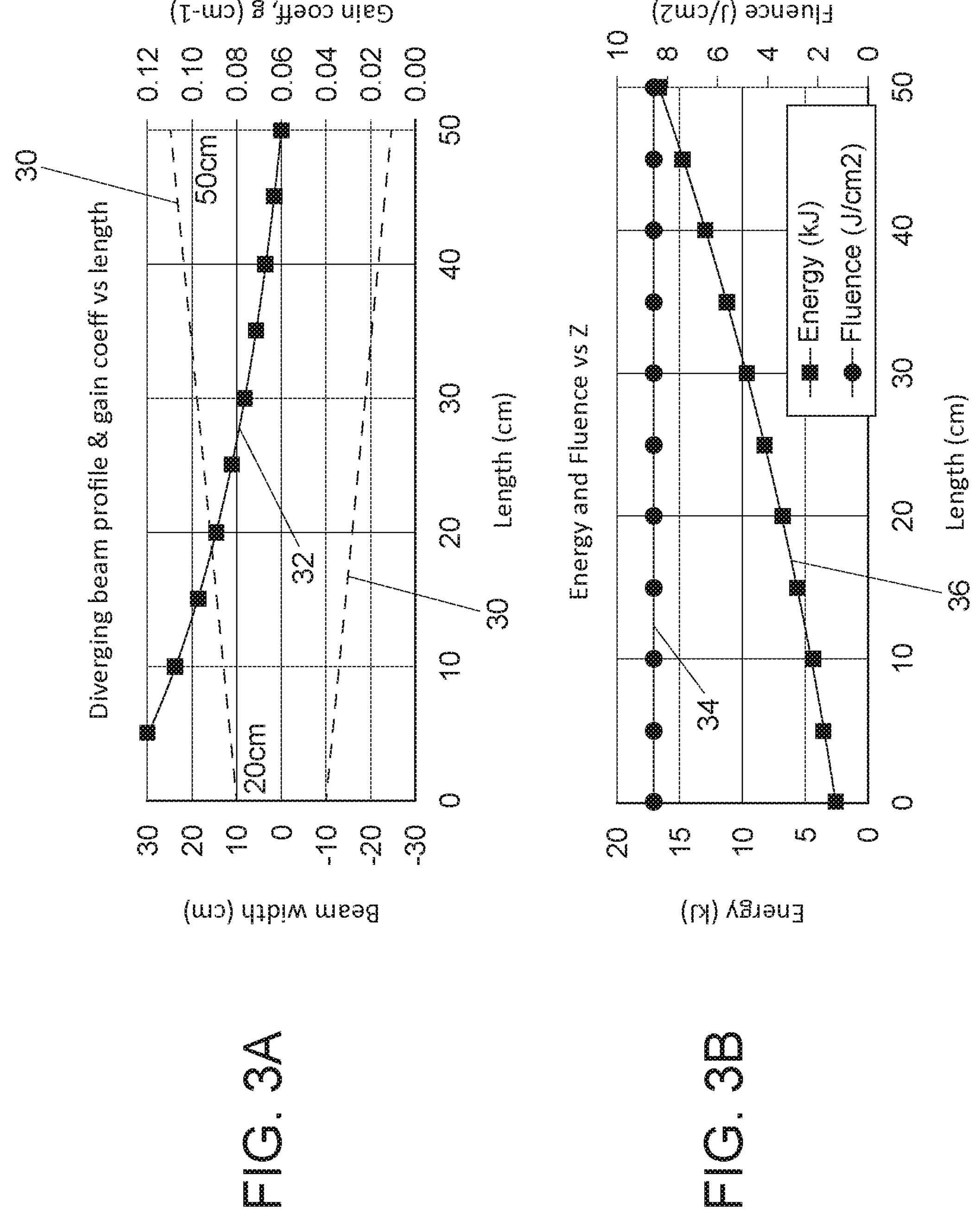
FIG. 3A shows a plot on axes of beam width (in cm) and length (in cm) that depicts the increasing beam width of an expanding beam in a gain medium such as shown in FIG. 2.
FIG. 3B shows a plot on axes of energy (in kJ) and length (in cm) that depicts the increase in optical energy of the laser beam along the length of the gain medium. As the laser beam propagates along the length of the gain medium, the optical energy thereof increases due to amplification by the gain medium.

Plots associated with a sample amplifier and gain medium design are presented n FIGS. 3A and 3B. FIG. 3A shows a pair of lines 30 that depicts the sides of a expanding beam 10 in a gain medium 14 such as shown in FIG. 2. The lines 30 illustrate how the width of the laser beam 10 increases with distance along the length of the beam and gain medium 14. In this example, the laser beam 10 has a width (e.g., parallel to the x and/or y axes) of 23 cm at the input surface 14*a* and has width of 50 cm at the output surface 14*b*. The length of the free space gain medium 14 in the longitudinal direction (e.g., parallel to the z axis), as well as of the laser beam 10 therein, is 50 cm. The width increases linearly with position along the length of the gain medium 10.

FIG. 3A also includes a plot 32 that shows the gain prescription, e.g., the value of the gain coefficient, g, at different locations along the length of the gain medium. In this design, the gain coefficient, g, decreases along the length of the gain medium. The gain coefficient is designed to be lower at an output end and/or output surface 14*b* of the gain medium 14 where a counter-propagating pump beam 18 enters the gain medium and has the highest intensity compared to the intensity of the pump beam elsewhere along the length of the gain medium. Conversely, the gain coefficient is designed to be higher at an input end and/or input surface 14*a* of the gain medium 14 where a counter-propagating pump beam 18 has been attenuated due to propagation through and absorption by the gain medium. In this manner, variation in the gain coefficient, g, with position along the length of the gain medium 14 can offset the changing intensity level of the counter-propagating pump beam 18 in the gain medium. In some implementations, an analytically derived prescription for the small signal gain coefficient, g, versus position along the length of the gain medium, z, can be obtain from the equations below:

$$g(z) = \frac{2K}{1+Kz} \quad K = \frac{\text{slope}}{\text{Start radius}}$$

where K is the slope of the increase of the beam width with position toward the output surface divided by the radius of the laser beam at the input of the gain medium. The small-signal gain comprises the gain that the laser beam experiences when the fluence of the beam is small and saturation is not reached. The small-signal gain is, therefore, a measure of the gain when only a small portion of the energy stored in the gain medium is extracted therefrom.

As discussed above, in various implementations described herein, the laser beam 10 has a constant fluence or substantially constant fluence across the length thereof. For example, laser beam (e.g., extraction laser beam) 10 may have a constant fluence to within about 55%, 50%, 40%, 30%, 20%, 10%, 5%, 3%, 2%, 1%, 0.5%, 0.1% along the length thereof in the longitudinal direction or may be in any range formed by any of these values and possibly larger or smaller. In some cases, this constant or near constant fluence may occur over at least about 45%, 50%, 60%, 70%, 80%, 90%, 95%, 97%, 98%, 99%, 99.5%, 100% of the length of the gain medium 14 in the longitudinal direction (e.g., parallel to the z-axis) or in any range formed by any of these values.

FIG. 3B shows a plot 34 that depicts a substantially constant fluence along the length of the gain medium 14. The near constant fluence within the gain element 14 results at least in part from compensation of the effect of the expansion of the laser beam 10, which contributions to reduction in the fluence, by the progressive transfer of optical energy from the gain medium to the laser beam as the laser beam propagate through the length of the gain medium, which contributes to an increase in the fluence. The gain coefficient, g, is also tailored to compensate attenuation of the pump radiation with propagation through the gain medium 14 from the larger output surface 14*b* to the smaller input surface 14*a*.

FIG. 3B also includes a plot 36 that depicts how the extraction laser beam 10 steadily increases in energy as it propagates through the gain medium 14 from the smaller face 14*a* toward the larger face 14*b*. As the laser beam 10 propagates along the length of the gain medium, the optical energy increases due to amplification caused by the gain medium 14.

These plots 34, 36 in FIG. 3B were calculated using the Frantz-Nodvik model. These plots 34, 36, based on the Frantz-Nodvik model in the regime where most of the energy is extracted from the gain medium, confirm that output energy is amplified while holding the fluence constant. As discussed herein, various implementations of optical amplifiers 5 may feature a constant or near constant fluence within the gain element 14, where the expansion of the laser beam 10 (which decreases the fluence) is compensated by a special longitudinal gain profile that adds the desired amount of energy to the extraction beam to maintain approximate constancy of the fluence.

Gain media can be characterized by a quantity known as the saturation fluence, given by the photon energy divided by the gain cross-section: $F_{SAT}=h\nu/\sigma_{GAIN}$. This saturation fluence, $F_{SAT}$, can be calculated using the Frantz-Nodvik model and possibly one or more equations related thereto. The saturation fluence which is a property of the gain medium can be insert in the Franz Novak model to determine how gain is extracted and how the output laser beam grows in fluence for a pulsed laser. A version of the Frantz-Nodvik equation that can be used is set forth below:

$$E_{out}=E_{sat}\ln[1+\exp(g_0)(\exp(E_{in}/E_{sat})-1]$$

where go is the initial gain and E, energy (e.g., $E_{out}$ is energy output). E, energy, can be changed to F, fluence, and thus $E_{out}$ can be changed to $F_{out}$, and $E_{sat}$ can be changed to $F_{sat}$. The extraction of energy by the laser beam 10 may be considered efficient when the laser beam has a fluence of about 1-2 times the value of $F_{SAT}$. Accordingly, in various optical amplifier designs, the optical amplifier 5 may be configured such that the laser beam 10 and/or the gain medium 14 has a fluence within of 1 to 2 times $F_{sat}$ or within ±50%, ±40%, ±30%, ±25%, ±20%, ±10%, ±5%, ±1%, ±0.5%, ±0.1% thereof along the length of the gain medium 14 in the longitudinal direction thereof.

Figures 4A, 4B:
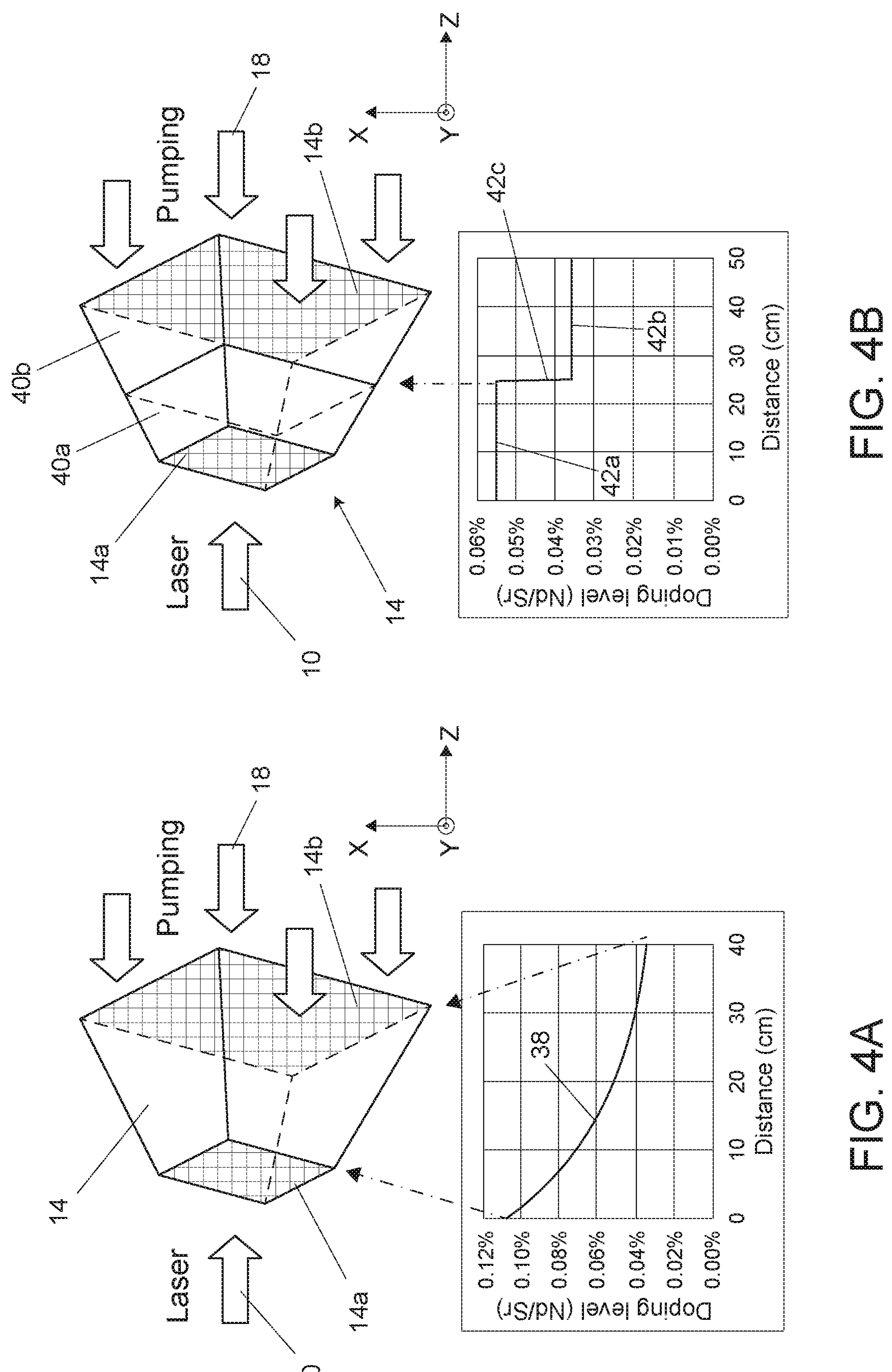
FIG. 4A is a perspective view of a gain medium comprising a frustum-shaped material doped to provide optical gain. The gain medium has an input and an output for a laser beam to be transmitted therethrough to be amplified.
FIG. 4B is a perspective view of a gain medium comprising a frustum-shaped material doped to provide optical gain. The gain medium has an input and an output for a laser beam to be transmitted therethrough to be amplified.

As discussed herein maintaining an appropriate fluence of the extraction beam 10, which in some cases is a constant or near constant fluence, may be facilitated by a suitable longitudinal gain profile in the gain medium 10 and an expanding extraction beam produced by the first negative optics 22 and/or accommodated for by a gain medium having a cross-section orthogonal to the longitudinal direction that expands with distance along the length of the gain medium. FIGS. 4A and 4B show two example designs and methods of achieving the desired gain profile. FIG. 4A depicts a gain medium 14 comprising a frustum shaped material doped with dopant such that the gain profile along the length of the gain medium is created by a concentration gradient of the dopants, e.g., laser ions. In this example, the gain medium 14 comprises a monolithic mass or host material that extends contiguously from the smaller input surface 14*a* to the larger output surface 14*b*. The variation in dopant level in units of neodymium atoms per strontium atom (Nd/Sr) with distance along the length of the gain medium 14 is shown by the profile 38 plotted in the lower portion of FIG. 4A. For this case, the gain medium is Nd-doped $SrF_2$ (neodymium doped strontium fluoride), and to facilitate constant fluence for the extraction beam 10, the concentration of Nd is highest at the laser input face 14*a* to increase the absorption of the pump light and thereby yield a higher gain coefficient. In this design, the converging nature of the pump laser beam 18 as well as the optical absorption gradient produced by the variation in dopant concentration (in this example Nd ion concentration) are factors that may be balanced or otherwise adjusted and/or considered in designing an amplifier 5 having the desired properties. Such properties may include as a desired fluence profile along the length of the gain medium 14 such as a constant or substantially constant fluence over the length of the gain medium.

Variations are possible. Although a smooth gradient is shown in this example, the concentration profile need not be smooth and need not be monotonic. Also although a curved gradient is shown, the gradient can be linear. Other variations in the concentration distribution are also possible.

In FIG. 4B, a simplified version of the gain medium 14 is depicted where two slabs or layers 40*a*, 40*b* are employed. As shown, the gain medium 14 comprises a plurality of slabs or layers 40*a*, 40*b* in series and contacting each other, for example, via an optical contact or possibly have antireflection coatings on their surfaces. Such layers may be two separate monoliths (e.g., slabs) adhered together or may potentially be two portions of a single monolith or monolithic mass of material doped to different levels. In the example shown, the different layers 40*a*, 40*b* have different concentrations, however the concentration within the respective layer is uniform across the thickness of that layer. The different concentrations of the respective layers are shown by different portions 42*a*, 42*b* of a concentration distribution shown in a plot at the bottom of FIG. 4B. The first portion 42*a* corresponding to the first slab or layer 40*a* closer to the smaller input face 14*a* has a higher concentration than the second portion 42*b* corresponding to the second slab or layer 40*b* closer to the larger output face 14*b*. The plot shows a step 42*c* in the dopant concentration between the two layers 40*a*, 40*b*, which in this example design have constant dopant concentration within individual layers. The different layers 42*a*, 42*b* have different dopant (e.g., laser ion) concentration that may roughly approximate a smooth concentration gradient. In some cases, the desired effect of either a stepped concentration variation and a smooth concentration variation with position along the length of the gain medium may be the same or sufficiently similar. For example, in both cases (e.g., the smooth gradient shown in FIG. 4A and the stepped variation shown in FIG. 4B), the variation in the concentration as a function of longitudinal position may able to achieve the goal of maintaining a constant or near constant fluence for the expanding extraction beam 10 such as describe above.

Variations are possible. For example, although the gain medium 14 comprises two and only two slabs or layers 40*a*, 40*b*, in other examples more slabs or layers may be used. Also, in some examples the dopant and the material in which the dopants are included may be the same for the different layers 40*a*, 40*b*. In other examples, one or more of the layers 40*a*, 40*b* may include a different dopant and/or a different host material in which the dopants are included.

One consideration for the amplifier design is that the collimating lens 24 reflects a portion of the light from the expanding laser beam 10 passing therethrough from the surfaces of the collimating lens. As a result of the curvature of the convex surface of the collimating lens 24, this weak back reflection can generate a "ghost" with the gain medium 14 where light reflected from the curved surface is focused down to a spot. Such a focus may potentially induce damage to the gain medium. In one configuration shown in FIG. 5A, for example, the collimating lens 24 comprises a plano-convex lens where the plano or flat surface of the lens faces the incoming diverging beam and thus would be closer to the diverging lens 22 (not shown). Light may reflect from the opposite surface, which is curved in a manner such that light reflected therefrom will converge to a spot. As can be seen in the ray traces in FIG. 5B, the plano-convex lens oriented in this manner is expected to have a caustic focus within the gain medium 14 due to reflection from the convex surface of the collimating lens 24, which is assumed to be spherically shaped in this example.

Figures 5A, 5B, 6A, 6B:
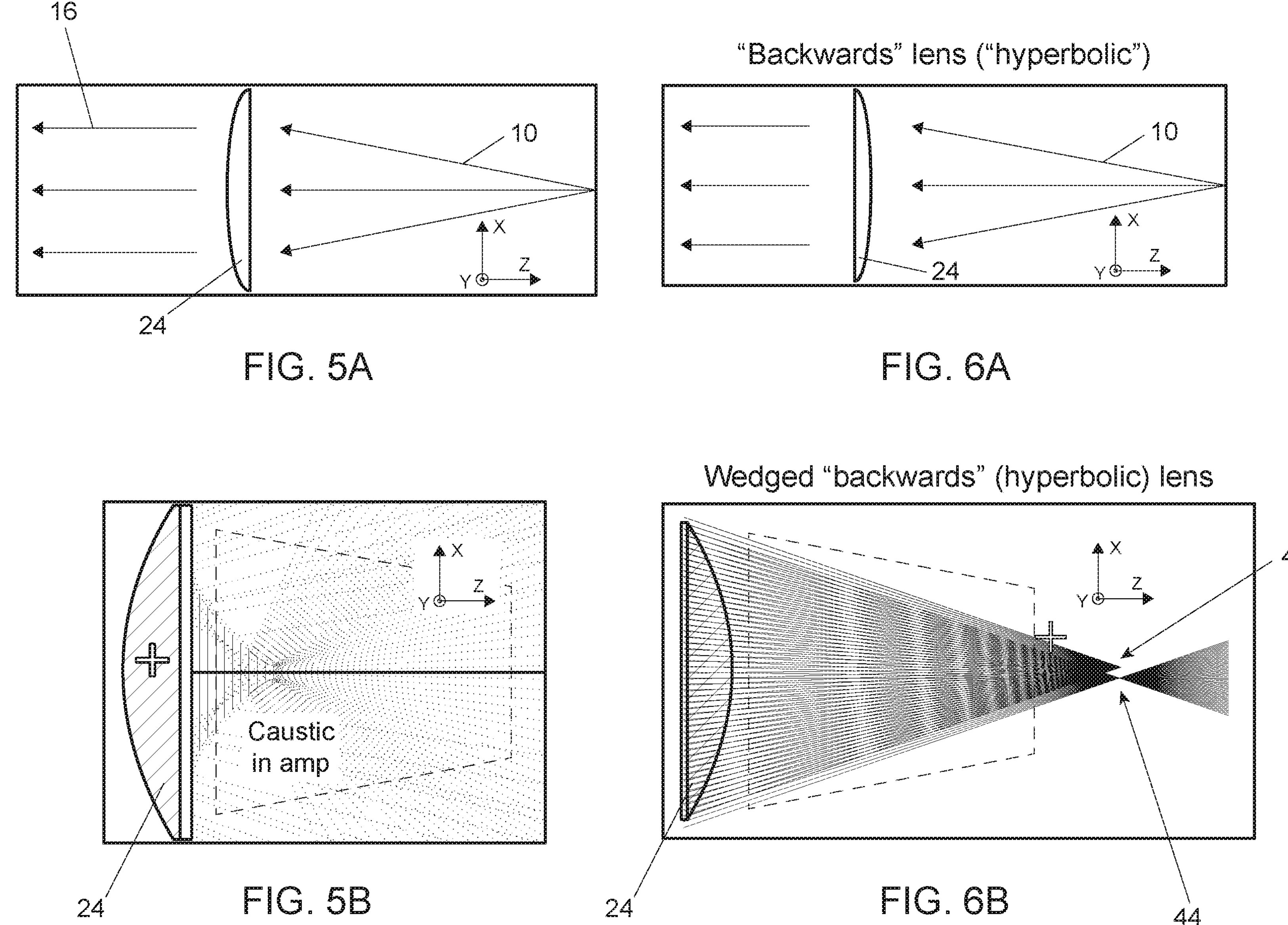
FIG. 5A is schematic view of a collimating lens disposed to receive the expanding laser beam propagating through the gain medium. In the example shown in FIG. 5A, the collimating lens comprises a plano-convex lens having a plano surface and a convex surface with the plano surface closer to the expanding beam and the convex surface closer to the collimated beam.
FIG. 5B is schematic view of a ray trace showing light from the laser beam to be amplified reflected from the convex surface of the collimated lens after propagating through the gain medium. The reflected light is directed back through the gain medium. The ray trace shows a caustic with an increased beam intensity at a location within the gain medium that may create an undesirable hot spot.
FIG. 6A is a schematic view of a collimating lens comprising a hyperbolic shaped lens disposed to receive the expanding laser beam propagating through the gain medium. In the example shown in FIG. 6A, the hyperbolic collimating lens comprises a plano-convex lens having a plano surface and a hyperbolic convex surface with the convex surface closer to the expanding beam and the plano surface closer to the collimated beam.
FIG. 6B is schematic view of a ray trace showing light from the laser beam to be amplified reflected from the plano surface of the collimated lens after propagating through the gain medium. The reflected light is directed back through the gain medium. The ray trace shows converge of light at a location beyond the gain medium, thereby avoiding or reducing the risk of creating an undesirable hot spot in the gain medium.

FIG. 6A shows an example design where the collimating lens 24 comprises a plano-convex lens oriented such that the convex surface faces the expanding laser beam 10 and thus is closer to the diverging lens 22 (not shown) and the gain medium 14. In this configuration, reflection from the convex surface is less of a problem. Additionally, a hyperbolic lens having a hyperbolically shaped curved surface may be employed. For additional information regarding hyperbolic lenses see, e.g., Gyeong-Il Kweon, J. Korean Physical Society, 51, pp. 93-103 (2007). As can be seen in the ray traces in FIG. 6B, the hyperbolic lens curvature can produce a focus 44 that is sufficiently distant from the collimating lens 24 to be beyond and outside the gain medium 14. Furthermore, a small amount of tilt may be provided to the planar surface of the collimating lens with respect to the convex surface to cause the reflected rays of light to form a caustic focus 46 located off-axis as shown in FIG. 6B. The ghost from a hyperbolic lens with a small wedge on the planar surface deflects the ghost such that it can potentially be blocked with a baffle, stop, spatial filter, etc. (not shown) near, e.g., the focal plane.

Figure 7:
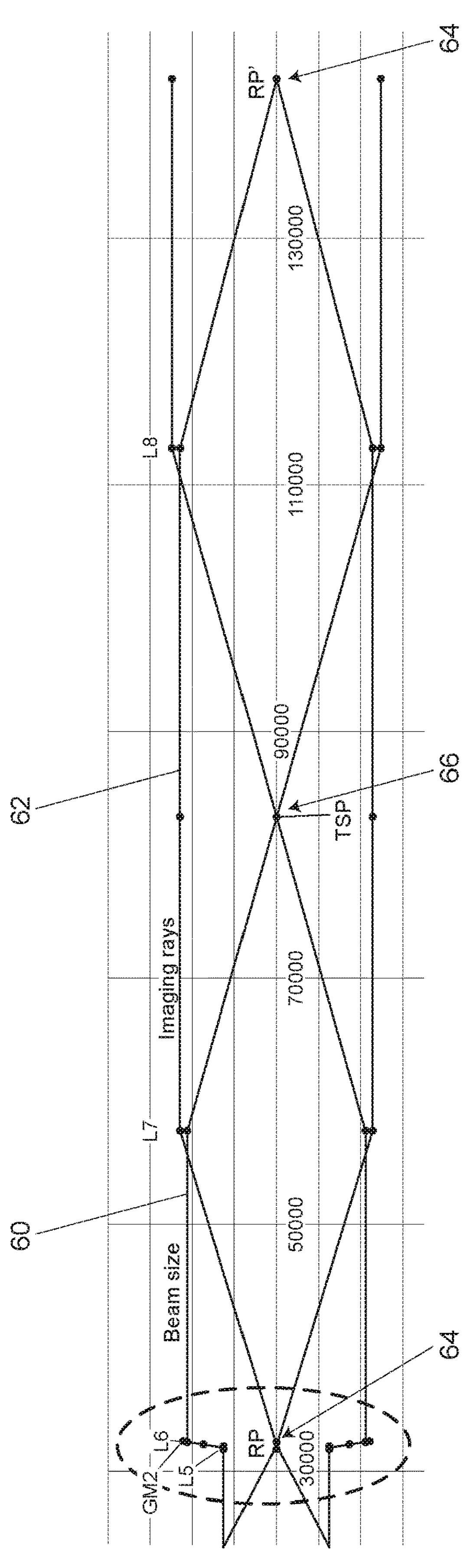
FIG. 7 is plot illustrating that an optical amplifier such as disclosed herein wherein a negative lens followed by the collimating lens does not substantially alter the image quality of the beam within the train of additional optics.

An imaging study showing the impact of including the optical amplifier 5 within an imaging optical system is presented in FIG. 7. FIG. 7 illustrates that an optical amplifier such as disclosed herein can be included within a laser having a plurality of optical elements such as lenses for conveying or relaying a beam through the laser and the gain medium does not substantially alter or degrade the quality of the beam within the laser. The plot in FIG. 7 includes a line 60 that represents the beam size along the laser beam in the laser. The plot in FIG. 7 also includes a line 62 that characterizes the relay planes along the transport of the laser beam. When this line 62 is closer to the axis, the laser beam is more in relay (e.g., has well-resolved, crisp, sharp, and/or not blurry edges). As illustrated, the collimated rays are introduced from the left, encounter negative lens 22 (labeled L5 in the diagram), pass through the gain medium 14 (labeled GM2 in the diagram), and are re-collimated by the collimating lens 24 (labeled L6 in the diagram). Accordingly, the dashed-circle region corresponds to the optical amplifier 5 (e.g., a "Galilean optical amplifier"), where L5 and L6 are negative and positive lenses, respectively. The laser beam from the amplifier is re-imaged or relayed on the far right by a conventional telescope optical arrangement comprising lenses L7 and L8 employed to propagate the beam within the laser. The plot shows relay planes RP and RP' 64 or intermediate image planes where the laser beam is more in relay (e.g., has well-resolved, crisp, sharp, and/or not blurry edges). A spatial filter 66 that can be used to clean up the beam is also shown. As shown, the beam remains collimated and the relay planes appear to be in focus demonstrating that the beam is propagated through the laser and the quality of the beam is not degraded by the insertion of the frustum shaped gain medium described herein.

This calculation shows that the optical amplifier 5 has reduced, e.g., substantially no impact, on the imaging of the system that includes it. The trace of the beam size remains collimated and the location of the imaging plane is not substantially altered by the amplifier 5. (The distance scale is essentially arbitrary.) This plot demonstrates that, for a short Galilean telescope formed by the diverging lens 22 and the collimating lens 24 with the frustum shaped gain medium 14 therein, the locations of the relay planes are not significantly altered by the introduction of a Galilean telescope (formed by lenses L7 and L8) in the optical train.

In various implementations of the optical amplifier 5 described herein, which may be referred to as the Galilean optical amplifier, having the gain medium 14 positioned between the diverging lens 22 and the collimating lens 24, the f-number (f/#) of the Galilean telescope formed by the diverging and collimating lenses is from 10 (f/10) to 2 (f/2), or 10 (f/10) to 1.5 (f/1.5), or 4 (f/2) to 1.5 (f/1.5) or within ±30%, ±20%, ±10%, ±5%, ±3%, ±1%, ±0.5% thereof, where the f/# is the focal length, f, divided by the maximum diagonal width of the extracting laser beam footprint. In various implementations, this f/# corresponds to the f/# of the positive optics or collimating optics 24. Accordingly, in various designs, the f/# of the positive optics or collimating optics 24 is from 10 (f/10) to 2 (f/2) or 10 (f/10) to 1.5 (f/1.5) or 4 (f/2) to 1.5 (f/1.5) or within ±30%, ±20%, ±10%, ±5%, ±3%, ±1%, ±0.5% thereof. If the f/# is too small, the fabrication of the lenses 22, 24 can become challenging and/or there may be enhanced reflectivity off the lens surfaces. Conversely, if the f/# is too large, the fluence may not be maintained (e.g., as constant) over a reasonable amplifier length.

One feature of the optical amplifiers 5 disclosed herein, which store optical energy in the gain medium 14, is that the energy storage is fundamentally limited by amplified spontaneous emission (ASE). ASE is a process where normal emission of the laser ions is amplified within the gain element, effectively resulting in "self-extraction" of the amplifier's energy, thereby reducing the energy that can be stored. Additionally, this energy is not generally coupled into the laser beam 10.

Figures 8A, 8B:
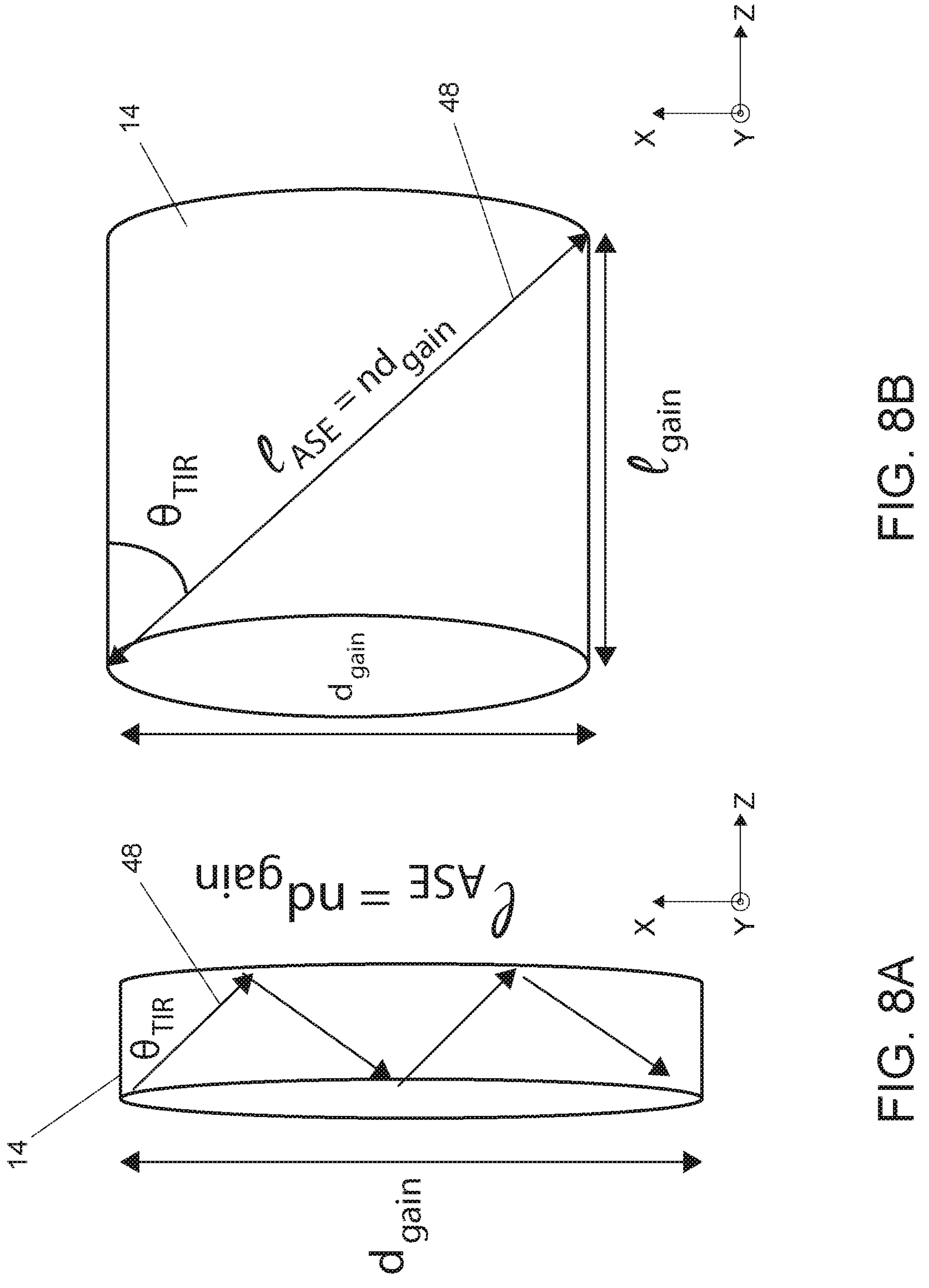
FIG. 8A is a schematic perspective view of a gain medium having a length shorter than a lateral dimension (e.g., width or diameter) thereof depicting total internal reflection of stray light that experiences Amplified Spontaneous Emission (ASE). Such ASE may deplete some of the energy that would alternatively be coupled into the laser beam to be amplified.
FIG. 8B is a schematic perspective view of a gain medium having a length at least has long as a lateral dimension (e.g., width or diameter) thereof depicting an optical path that potentially experiences a similar amount of ASE as that shown in FIG. 8A. The gain medium shown in FIG. 8B, however, is longer than the gain medium shown in FIG. 8A and thus potentially produces more amplification of the laser beam input thereto.

FIGS. 8A and 8B illustrate the potential for ASE for different configurations of the gain medium 14. FIG. 8A shows a slab-shaped gain medium 14 having a thickness in the longitudinal direction (parallel to the z-axis) that is shorter than the width or lateral dimension (parallel to the x or y axes). This gain medium 14 may comprise a cylindrical slab-shaped element that can store energy when pumped. ASE is most impacted by the longest rays in the gain medium 14. The longest ray paths 48 are shown in FIG. 8A as those that are totally-internally reflected (TIR'ed). The longest rays 48 are most significant because ASE experiences exponentiated growth, G=exp ($\alpha_{gain} l_{ASE}$), where $\alpha_{gain}$ is the gain coefficient (proportional to the stored energy density) and $l_{ASE}$ is the maximum ray length. This simplification approximately holds for many relevant gain levels. To increase the output energy in the amplified laser beam 10, the optical amplifier 5 would likely include many such slabs arranged in sequence. However, the plurality of the individual slabs can in principle be replaced with a single long cylinder gain medium 14 such as shown in FIG. 8B. Such a contiguous or monolithic laser gain medium 14 would, however, experience about the same level of ASE loss when its diagonal is set equal to the refractive index times the diameter, $nd_{gain}$. (In the example described in connection with FIGS. 8A and 8B, the diameters, $d_{gain}$ may be equal although not appearing the same size in the drawings.) Arguably therefore, a single thick contiguous or monolithic gain medium 14 such as shown in FIG. 8B may produce essentially the same ASE than a gain medium comprising plurality of thinner slabs such as shown in FIG. 8A.

Figure 9B:
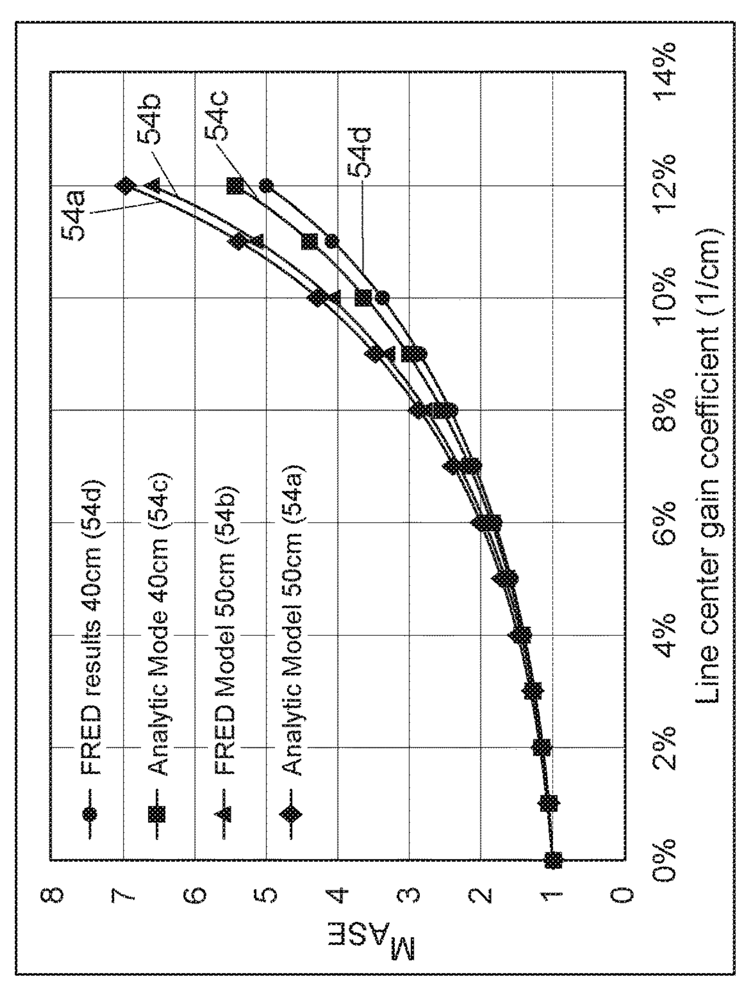
FIG. 9B is plot on axes of ASE enhancement in the emission rate (unitless) and gain coefficient (in percentage per centimeter) that shows the ASE enhancement of the emission rate within a gain medium as a function of the gain coefficient. Some of these curves were calculated using Monte Carlo ray-trace code (FRED) while other curves were calculated using a polynomial expansion series.
Figure 9A:
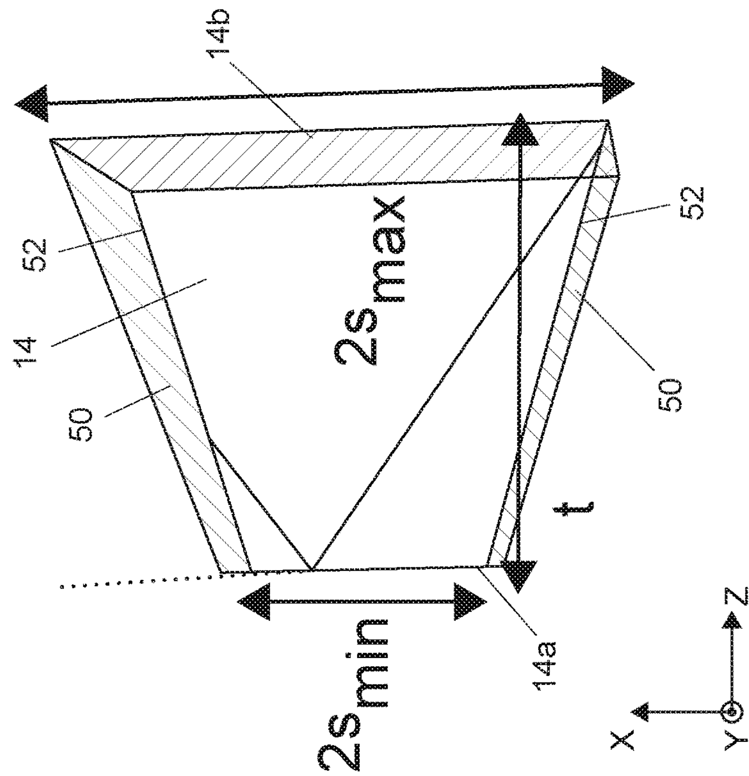
FIG. 9A is perspective side view of gain medium having absorbers on the sidewalls thereof.

Advanced quantitative ASE models can be used to characterize gain media of various shapes. FIG. 9A for example shows a trapezoidal-shaped gain medium (frustum) having input and output surfaces 14*a*, 14*b* with the output surface larger than the input surface. FIG. 9B shows a plot that illustrates the increase in ASE with dopant level. A Monte Carlo procedure is employed to trace millions of rays within the gain medium 14 (e.g., using the commercial "FRED" code). The FRED ray tracing analysis can be simplified to a polynomial expansion based on dimensions of the gain medium. The (nominally uniform) gain coefficient is on the abscissa. On the ordinate is $M_{ASE}$, which specifies the enhancement in the emission rate due to ASE, which competes with the pumping rate. The curves 54*a*, 54*b*, 54*c*, 54*d* in FIG. 9B are for the Monte Carlo FRED output and for the approximate polynomial expansion analytical form referenced above for approximately 40 cm and 50 cm long gain media. These curves demonstrate that for these lengths, ASE increases with gain as well as with the length of the gain medium.

For gain media 14 such as those illustrated in FIGS. 8A, 8B, and 9, so-called ASE absorbers 50 on sidewalls 50 of the material comprising the gain medium 14 can be used to absorb the ASE emission. The ASE absorber 50 can be in optical-contact with one or more or all the surfaces (e.g., side surfaces) 52 through which the laser beam 10 does not need to pass through. The absorber 50 may comprise an edge cladding. The absorber 50 may comprise material having a similar or the same refractive index as the main body of the gain medium 14 (e.g., the host material) and may be doped to be absorbing. The absorber 50 may be on the sidewalls 52 of the main body of the gain medium 14 such as the four sidewalls surrounding the rectangular input and output faces 14*a*, 14*b* shown in FIG. 9A. The thickness or length of the gain medium 14 is marked as, t, in FIG. 9A. In various implementations, the absorbers are configured to absorb at or near the wavelength at which the gain medium experiences Amplified Spontaneous Emission (ASE) and/or the lasing wavelength.

In various implementations, the length of the gain medium 14 may be on the order of the length of a side of the larger face 14*b*. For example, the length of the gain medium 14 may be 40-50 cm and the width of the gain medium at the output surface 14*b* may also be about 40 cm and the input surface 14*a* may be 20-25 cm. Accordingly, the length of the gain medium 14 may be the same as or within ±50%, ±45%, ±40%, ±35%, ±30%, ±25%, ±20%, ±15%, ±10%, ±5%, ±3%, ±1%, ±0.5%, ±0.1% of a lateral dimensions such as width of the output surface 14 or the gain medium or material comprising the gain medium at the output surface. Other dimensions are also possible.

A wide variety of configurations and designs are possible. In various implementations, the gain medium 14 employed for the amplifier would be based on $Nd^{3+}$-doped host media, such as $Nd^{3+}$ in phosphate glass, $SrF_2$, YLF ($LiYF_4$), (YAG) $Y_3Al_5O_{12}$, and many other hosts, including but not limited to oxides or fluorides. Other rare earth ions can furnish gain, such as $Er^{3+}$, $Tm^{3+}$, and $Ho^{3+}$. Many transition metals, such as $Ti^{3+}$, can be employed as the laser ion.

Other types of lasers can benefit from the design principles discussed herein. In these laser systems the laser ions are pumped to achieve adequate gain in the host medium with manageable levels of loss and wavefront distortion in the gain medium/gain element 14. Nd-based lasers can be pumped by flashlamp-pumped chromium lasers such as Alexandrite, Cr:LiCAF and Cr:LiSAF. Other examples of pump sources are Ho-lasers pumped with Tm-fiber lasers, utilizing various types of diodes to pump the aforementioned rare earth ions, and pumping Ti:Sapphire with doubled Nd-lasers. In some cases, direct flashlamp-pumping or diode array pumping is possible.

The selection of the gain medium 14 may be impacted by the magnitude of the saturation fluence. Gain media 14 with higher saturation fluence can store more energy (which may imply the emission cross-section is less, yielding reduced gain and ASE). The higher saturation fluence may also dictate that the fluence of the extracting beam 10 would be higher; however, reducing or avoiding deleterious nonlinear effects that degrade the beam quality or lead to optical damage at high intensity, typically due to high-fluence in nanosecond or shorter pulses may also be a consideration. Various approaches are available for reducing the nonlinear distortions for short-pulses in isotropic media, for example, by introducing the extraction pulse as circularly-polarized light. The nonlinear distortions are sensitive to the pulse shape that is introduced into the amplifier, which can be designed or optimized for the particular application by taking gain saturation into consideration.

The pumping geometry is flexible. In many designs though, the longitudinal gain profile is consistent with achieving a relatively constant fluence of about $1\text{-}2\times F_{SAT}$ as discussed above. Achieving this could involve counter-propagating longitudinal pumping as discussed above, co-propagating the pump and extraction beams, and/or side-pumping the gain medium. The gain medium may also comprise of a liquid, such as a dye in a solvent, or a vapor, such as an alkali metal as well as solid material. The liquid, vapor, or solid may be pumped to exhibit gain.

In various implementations, the outputted laser beam 16 is substantially contiguous and unobstructed across its aperture. For example, outputted laser beam 16 may be contiguous across an area at least as large as 50%, 60%, 70%, 75%, 80%, 90%, 95%, 98%, 99%, 99.5%, 99.9%, or 100% the area of said output surface or any range between any of these values.

In various implementations the extraction efficiency from the gain medium is at least about 40%, 50%, 60%, 70%, 80% ,90% or any range between any of these values.

In various implementations the pump beam enters the amplifier with a larger size at the output face and focuses to a smaller area. In some implementations, the pump beam and the extraction laser beam are co-propagating. In some implementations, the optical amplifier is side-pumped, for example, with the side pumping perpendicular or substantially perpendicular to the extraction beam.

In some implementations, both the input and output surfaces are concave with respect to the inputted laser beam. In some cases, for example, the curvature of the surfaces are perpendicular or substantially perpendicular to the inputted diverging laser beam direction of propagation.

As discussed above, in various implementations, a host is doped with ions configured to produce gain. In some implementations, the gain medium comprise a single-crystal, glass, or ceramic host doped with laser ions.

In some implementations, the pump source comprises a source of coherent or quasi-coherent light such as from laser diodes, laser diode arrays, and solid-state lasers. In some cases, the solid-state laser comprises a Cr-laser such as Cr:LiSaF, Cr:LiCAF or alexandrite. In some implementations the pump source comprises flashlamps. In some implementations, the gain medium is diode pump. In some implementations, the gain medium comprises a diode-pumped Er-, Tm- or Ho-doped host.

Accordingly, in some implementations, the gain medium comprises Er-, Tm- or Ho-doped host. However different dopants may be employed. In some implementations, the gain medium may comprise material providing gain wherein the material comprises a Nd-doped host, such as for example Nd:YAG, Nd:$SrF_2$, Nd:YLF, or Nd-doped phosphate glass.

In some implementations, the amplifier is able to generate high energies, for example at least 10 Joules, 100 Joules, 1 kilojoule, possibly at least 10 kilojoules, possibly at least 40 kilojoules or any range formed by any of these values.

In some implementations, laser pulses of from 1-20 nanoseconds or about 1-20 nanoseconds in duration are extracted from the optical amplifier. In some cases, the amplifier outputs a pulse that is tailored in time to account for gain saturation and/or nonlinear distortions.

In some implementations, the amplifier is pumped to near the amplified spontaneous emission (ASE) limit. In some implementations, the amplifier is pumped to at or within 25%, 20%, 10%, 5%, 2%, or 1% of the Amplified Spontaneous Emission (ASE) limit or any range formed by any of these values.

In some implementations, the laser beam is circularly polarized.

In various implementations, the gain medium has a length longer than its width. In some implementations, the gain medium comprises a monolithic or contiguous material that provides optical gain (and ASE) having a length longer than its width.

In some implementations, the optical amplifier is a component of a laser system, wherein the laser system operates as a single-shot laser system. In some implementations, the optical amplifier is a component of a laser system, wherein the laser system operates as a repetitively-pulsed laser system. In some implementations, the optical amplifier is a component of a laser system, wherein the laser system operates as a Q-switched laser system. In some implementations, the optical amplifier is a component of a laser system, wherein the laser system operates as a mode-locked laser system. These laser systems may potentially operate at low or high power levels.

Although FIG. 2 shows a single pass amplifier, the optical amplifier may comprise a double pass amplifier configured to pass the laser beam twice through the gain medium, once in a first direction and then in a second return (e.g., first backward and second in the forward direction). In various implementations, the energy in the laser beam in the first pass is lower than in the second pass, the energy growing with passage through the gain medium and thus being higher in the second pass.

EXAMPLES

This disclosure provides various examples of devices, systems, and methods for extracting energy from a gain medium and amplifying a laser beam. Some such examples include but are not limited to the following examples.

1. An optical amplifier comprising:
   first optics configured to receive a laser beam and output an expanding beam;
   a gain medium comprising material configured to provide optical gain to laser light transmitted therethrough, said gain medium having an input surface and an output surface separated from each other in a longitudinal direction by a length, said input surface extending in first and second directions orthogonal to said longitudinal direction so as to have an input area, said output surface extending in said first and second directions orthogonal to said longitudinal direction so as to have an output area, said output area being larger in both said first and second directions than said input area, said gain medium being positioned such that said expanding beam is received into said input surface and output through said output surface, said expanding beam having a larger beam size in both said first and second directions at said output surface than at said input surface; and
   an optical pump source configured to provide output pump radiation to said gain medium such that said material provides optical gain to said expanding beam transmitted therethrough.
2. The optical amplifier of any of the examples above, wherein said gain medium comprises a frustum of said material configured to provide optical gain.
3. The optical amplifier of any of the examples above, wherein said gain medium comprises a truncated cone or truncated pyramid.
4. The optical amplifier of any of the examples above, wherein said gain medium does not comprise a waveguide.
5. The optical amplifier of any of the examples above, wherein said input surface, said output surface, or both are curved.
6. The optical amplifier of any of the examples above, wherein said input surface is curved.
7. The optical amplifier of any of the examples above, wherein said input surface is concave.
8. The optical amplifier of any of the examples above, wherein said output surface is curved.
9. The optical amplifier of any of the examples above, wherein said input surface is convex.
10. The optical amplifier of any of the examples above, wherein said material comprising said gain medium comprises glass, a dielectric crystal or ceramic.
11. The optical amplifier of any of the examples above, wherein said material comprises glass.
12. The optical amplifier of any of the examples above, wherein said material comprises dielectric crystal.
13. The optical amplifier of Examples 10 or 12, wherein said dielectric crystal comprise garnet, strontium fluoride, lithium fluoride, yttrium aluminum garnet (YAG), or yttrium lithium fluoride (YLF).
14. The optical amplifier of any of the examples above, wherein said optical material comprising said gain medium comprises ceramic.
15. The optical amplifier of any of the examples above, wherein said material comprising the gain medium does not comprise an electrically-pumped semiconductor.
16. The optical amplifier of any of the examples above, wherein said gain medium has a larger small-signal gain at said input surface than at said output surface.
17. The optical amplifier of any of the examples above, wherein said gain medium is doped with dopants that provide optical gain.
18. The optical amplifier of any of the examples above, wherein said gain medium is doped with dopants so as to provide a higher average dopant level closer to said input surface than said output surface.
19. The optical amplifier of any of the examples above, wherein said gain medium has a gain coefficient, g, that decreases on average in the longitudinal direction, with higher dopants level closer to said input surface than said output surface.
20. The optical amplifier of any of the examples above, wherein said material configured to provide optical gain comprises first and second sections, said first section closer to said input surface and said second section closer to said output surface, wherein said first section has a higher dopant level than said second section.
21. The optical amplifier of any of the examples above, wherein said gain medium is doped with dopants so as to provide on average a gradient in dopant level from said input surface to said output surface.
22. The optical amplifier of any of the examples above, wherein said dopant comprises a rare earth ion or a transition metal.
23. The optical amplifier of any of the examples above, wherein said dopant comprises a rare earth ion selected from the group of Ce, Pr, Nd, Pm, Sm, Eu, Tb, Dy, Er, Tm, Ho, or Yb.
24. The optical amplifier of any of the example above, wherein said dopant comprises a transition metal selected from the group of Ti, V, Cr, Fe, Co, or Ni.
25. The optical amplifier of any of the examples above, wherein said laser beam in the gain medium has a constant fluence to within about ±50% along the longitudinal direction thereof.
26. The optical amplifier of any of the examples above, wherein said laser beam in the gain medium has a constant fluence to within about ±20% along the longitudinal direction thereof.

27. The optical amplifier of any of the examples above, wherein said laser beam in the gain medium has a constant fluence to within about ±10% along the longitudinal direction thereof.
28. The optical amplifier of any of the examples above, wherein said laser beam in the gain medium has a constant fluence to within about ±5% along the longitudinal direction thereof.
29. The optical amplifier of any of the examples above, wherein said laser beam in the gain medium has a fluence within of 1 to 2 times $F_{sat}$ or within ±50% thereof along the longitudinal direction thereof.
30. The optical amplifier of any of the examples above, wherein said laser beam in the gain medium has a fluence within of 1 to 2 times $F_{sat}$ or within ±30% thereof along the longitudinal direction thereof.
31. The optical amplifier of any of the examples above, wherein said laser beam in the gain medium has a fluence within of 1 to 2 times $F_{sat}$ or within ±10% thereof along the longitudinal direction thereof.
32. The optical amplifier of any of the examples above, wherein said laser beam in the gain medium has a fluence within of 1 to 2 times $F_{sat}$ or within ±1% thereof along the longitudinal direction thereof.
33. The optical amplifier of any of the examples above, wherein said laser beam in the gain medium has a fluence within of 1 to 2 times $F_{sat}$ along the longitudinal direction thereof.
34. The optical amplifier of any of the examples above, wherein said first optics comprises a lens.
35. The optical amplifier of any of the examples above, wherein said first optics comprises a negative lens.
36. The optical amplifier of any of the examples above, further comprising second optics positioned to receive the laser beam output from the gain medium and to reduce the divergence of said laser beam.
37. The optical amplifier of any of the examples above, wherein said second optics comprises a lens.
38. The optical amplifier of any of the examples above, wherein said second optics comprises a positive lens.
39. The optical amplifier of any of the examples above, wherein said second optics comprises a collimating lens.
40. The optical amplifier of any of the examples above, wherein said second optics comprises a hyperbolic lens.
41. The optical amplifier of any of the examples above, wherein said second optics comprises a plano-convex lens having plano and convex surfaces with said convex surface closer to said gain medium than said convex surface.
42. The optical amplifier of any of the examples above, wherein said optical amplifier is configured as a single pass amplifier.
43. The optical amplifier of any of the examples above, wherein said optical amplifier is configured as a double pass amplifier.
44. The optical amplifier of any of the examples above, wherein said pump radiation is introduced to said gain medium through said second optics.
45. The optical amplifier of any of the examples above, wherein said gain medium is longitudinally-pumped or side-pumped, said pumping inducing gain
46. The optical amplifier of any of the examples above, further comprising a dichroic reflector disposed in an optical path between said pump source and said gain medium such that said pump radiation is directed through said dichroic reflector to said gain medium and said amplified laser beam is reflected from said dichroic reflector toward an output of said optical amplifier.
47. The optical amplifier of any of the examples above, wherein said expanding laser beam and said pump radiation are counter-propagating through said free-space optical gain medium.
48. The optical amplifier of any of the examples above, wherein said pump source comprises a pump laser.
49. The optical amplifier of any of the examples above, wherein said outputted laser beam is contiguous across an area about as large as the output area of said output surface.
50. The optical amplifier of any of the examples above, wherein said outputted laser beam is contiguous across an area at least as large as 50% the area of said output surface.
51. The optical amplifier of any of the example above, wherein said outputted laser beam is contiguous across an area at least as large 75% the area of said output surface.
52. The optical amplifier of any of the examples above, wherein said outputted laser beam is contiguous across an area at least as large as 90% the area of said output surface.
53. The optical amplifier of any of the examples above, wherein said second lens has an f-number (f/#) of 1.5 to 10.
54. The optical amplifier of any of the examples above, wherein the gain medium has a transverse gain profile that is smaller at the input surface and larger at the output surface.
55. The optical amplifier of any of the examples above, wherein the gain medium has gain distribution extending along a length comparable to the width of the footprint of the transverse gain profile at the output surface of the gain medium.
56. The optical amplifier of any of the examples above, wherein the gain medium has a length comparable to the width of the output surface.
57. The optical amplifier of any of the examples above, wherein the input surface is about 10% to 50% the area of the output surface.
58. The optical amplifier of any of the examples above, wherein the input surface is concave and the output surface is convex and the curvature of the input surface and the output surface are configured to be perpendicular to the direction of propagation of the expanding laser beam.
59. The optical amplifier of any of the examples above, wherein said material comprising said gain medium comprises a single crystal.
60. The optical amplifier of any of the examples above, wherein said gain medium comprises sidewalls with absorbers thereon.
61. The optical amplifier of any of the examples above, wherein said gain medium comprises sidewalls with absorbers thereon configured to absorb a wavelength of amplified spontaneous emission and/or the wavelength of the laser beam.
62. The optical amplifier of any of the examples above, wherein said optical pump source is configured to longitudinally-pump or side-pump said gain medium.
63. The optical amplifier of any of the examples above wherein the optical pump source comprises a diode array or a laser.

64. The optical amplifier of any of the examples above, wherein said gain medium comprises of a single-crystal, ceramic, or glass host medium.
65. The optical amplifier of any of the examples above, wherein said gain medium is doped with one or more rare earth dopants or transition metal dopants, said dopants singly or in aggregate providing gain to said optical amplifier when pumped.
66. The optical amplifier of any of the examples above Example 65, wherein said dopant is selected from Ti, Nd, Er, Tm, Ho or Yb.
67. The optical amplifier of any of the examples above, wherein said optical amplifier includes ASE-absorbing edge cladding.
68. The optical amplifier of any of the Examples above, wherein said optics have an f/# in a range from 1.5 to 10,
69. The optical amplifier of any of the Examples above, wherein said optics have an f/# in a range from 2 to 5.
70. An optical amplifier comprising:
    a gain medium comprising material configured to provide optical gain to laser light transmitted therethrough, said gain medium having an input surface and an output surface separated from each other in a longitudinal direction by a length, said input surface extending in first and second directions orthogonal to said longitudinal direction so as to have an input area, said output surface extending in said first and second directions orthogonal to said longitudinal direction so as to have an output area, said output area being larger in both said first and second directions than said input area.
71. The optical amplifier of Example 60, further comprising an optical pump source configured to provide output pump radiation to said gain medium such that said material provides optical gain to said beam of light transmitted therethrough.
72. The optical amplifier of any of the examples above, wherein said gain medium comprises a frustum of said material configured to provide optical gain.
73. The optical amplifier of any of the examples above, wherein said gain medium comprises a truncated cone or truncated pyramid.
74. The optical amplifier of any of the examples above, wherein said gain medium does not comprise a waveguide.
75. The optical amplifier of any of the examples above, wherein said input surface, said output surface, or both are curved.
76. The optical amplifier of any of the examples above, wherein said input surface is curved.
77. The optical amplifier of any of the examples above, wherein said input surface is concave.
78. The optical amplifier of any of the examples above, wherein said output surface is curved.
79. The optical amplifier of any of the examples above, wherein said input surface is convex.
80. The optical amplifier of any of the examples above, wherein said material comprising said gain medium comprises glass, a dielectric crystal or ceramic.
81. The optical amplifier of any of the examples above, wherein said material comprises glass.
82. The optical amplifier of any of the examples above, wherein said material comprises dielectric crystal.
83. The optical amplifier of Examples 70 or 72, wherein said dielectric crystal comprise garnet, strontium fluoride, lithium fluoride, yttrium aluminum garnet (YAG), or yttrium lithium fluoride (YLF).
84. The optical amplifier of any of the examples above, wherein said optical material comprising said gain medium comprises ceramic.
85. The optical amplifier of any of the examples above, wherein said material comprising the gain medium does not comprise an electrically-energized semiconductor.
86. The optical amplifier of any of the examples above, wherein said gain medium has a larger small-signal gain at said input surface than at said output surface.
87. The optical amplifier of any of the examples above, wherein said gain medium is doped with dopants that provide optical gain.
88. The optical amplifier of any of the examples above, wherein said gain medium is doped with dopants so as to provide a higher average dopant level closer to said input surface than said output surface.
89. The optical amplifier of any of the examples above, wherein said gain medium has a gain coefficient, g, that decreases on average in the longitudinal direction, with higher dopants level closer to said input surface than said output surface.
90. The optical amplifier of any of the examples above, wherein said material configured to provide optical gain comprises first and second sections, said first section closer to said input surface and said second section closer to said output surface, wherein said first section has a higher dopant level than said second section.
91. The optical amplifier of any of the examples above, wherein said gain medium is doped with dopants so as to provide on average a gradient in dopant level from said input surface to said output surface.
92. The optical amplifier of any of the examples above, wherein said dopant comprises a rare earth ion or a transition metal.
93. The optical amplifier of any of the examples above, wherein said dopant comprises a rare earth ion selected from the group of Ce, Pr, Nd, Pm, Sm, Eu, Tb, Dy, Er, Tm, Ho, or Yb.
94. The optical amplifier of any of the examples above, wherein said dopant comprises a transition metal selected from the group of Ti, V, Cr, Fe, Co, or Ni.
95. The optical amplifier of any of the examples above, wherein said laser beam in the gain medium has a constant fluence to within about ±50% along the longitudinal direction thereof.
96. The optical amplifier of any of the examples above, wherein said laser beam in the gain medium has a constant fluence to within about ±20% along the longitudinal direction thereof.
97. The optical amplifier of any of the examples above, wherein said laser beam in the gain medium has a constant fluence to within about ±10% along the longitudinal direction thereof.
98. The optical amplifier of any of the examples above, wherein said laser beam in the gain medium has a constant fluence to within about ±5% along the longitudinal direction thereof.
99. The optical amplifier of any of the examples above, wherein said laser beam in the gain medium has a fluence within of 1 to 2 times $F_{sat}$ or within ±50% thereof along the longitudinal direction thereof.
100. The optical amplifier of any of the examples above, wherein said laser beam in the gain medium has a fluence within of 1 to 2 times $F_{sat}$ or within ±30% thereof along the longitudinal direction thereof.

101. The optical amplifier of any of the examples above, wherein said laser beam in the gain medium has a fluence within of 1 to 2 times $F_{sat}$ or within ±5% thereof along the longitudinal direction thereof.

102. The optical amplifier of any of the examples above, wherein said laser beam in the gain medium has a fluence within of 1 to 2 times $F_{sat}$ or within ±1% thereof along the longitudinal direction thereof.

103. The optical amplifier of any of the examples above, wherein said laser beam in the gain medium has a fluence within of 1 to 2 times $F_{sat}$ along the longitudinal direction thereof.

104. The optical amplifier of any of the examples above, wherein said first optics comprises a lens.

105. The optical amplifier of any of the examples above, wherein said first optics comprises a negative lens.

106. The optical amplifier of any of the examples above, further comprising second optics positioned to receive the laser beam output from the gain medium and to reduce the divergence of said laser beam.

107. The optical amplifier of any of the examples above, wherein said second optics comprises a lens.

108. The optical amplifier of any of the examples above, wherein said second optics comprises a positive lens.

109. The optical amplifier of any of the examples above, wherein said second optics comprises a collimating lens.

110. The optical amplifier of any of the examples above, wherein said second optics comprises a hyperbolic lens.

111. The optical amplifier of any of the examples above, wherein said second optics comprises plano-convex lens having plano and convex surfaces with said convex surface closer to said gain medium than said convex surface.

112. The optical amplifier of any of the examples above, wherein said optical amplifier is configured as a single pass amplifier.

113. The optical amplifier of any of the examples above, wherein said optical amplifier is configured as a double pass amplifier.

114. The optical amplifier of any of the example above, wherein said pump radiation is introduced to said gain medium through said second lens.

115. The optical amplifier of any of the examples above, wherein said gain medium is longitudinally-pumped or side-pumped.

116. The optical amplifier of any of the examples above, further comprising a dichroic reflector disposed in an optical path between said pump source and said gain medium such that said pump radiation is directed through said dichroic reflector to said gain medium and said amplified laser beam is reflected from said dichroic reflector toward an output of said optical amplifier.

117. The optical amplifier of any of the examples above, wherein said expanding laser beam and said pump radiation are counter-propagating through said free-space optical gain medium.

118. The optical amplifier of any of the examples above, wherein said pump source comprises a pump laser.

119. The optical amplifier of any of the examples above, wherein said outputted laser beam is contiguous across an area at least as large as the input area of said input surface.

120. The optical amplifier of any of the examples above, wherein said outputted laser beam is contiguous across an area at least as large as 50% the area of said output surface.

121. The optical amplifier of any of the examples above, wherein said outputted laser beam is contiguous across an area at at least as large 75% the area of said output surface.

122. The optical amplifier of any of the examples above, wherein said outputted laser beam is contiguous across an area at least as large as 90% the area of said output surface.

123. The optical amplifier of any of the examples above, wherein said second lens has an f-number (f/#) of 1.5 to 10.

124. The optical amplifier of any of the examples above, wherein the gain medium has a transverse gain profile that is smaller at the input surface and larger at the output surface.

125. The optical amplifier of any of the examples above, wherein the gain medium has gain distribution extending along a length comparable to the width of the footprint of the transverse gain profile at the output surface of the gain medium.

126. The optical amplifier of any of the examples above, wherein the gain medium has a length comparable to the width of the output surface.

127. The optical amplifier of any of the examples above, wherein the input surface is about 10% to 50% the area of the output surface.

128. The optical amplifier of any of the examples above, wherein the input surface is concave and the output surface is convex and the curvature of the input surface and the output surface are configured to be perpendicular to the direction of propagation of the expanding laser beam.

129. The optical amplifier of any of the examples above, wherein said material comprising said gain medium comprises a single crystal, ceramic or glass.

130. The optical amplifier of any of the examples above, wherein said material comprising said gain medium comprises a single crystal.

131. The optical amplifier of any of the examples above, wherein said gain medium comprises sidewalls with absorbers thereon.

132. The optical amplifier of any of the examples above, wherein said gain medium comprises sidewalls with absorbers thereon configured to absorb a wavelength of amplified spontaneous emission and/or the wavelength of the laser beam.

133. The optical amplifier of any of the examples above, wherein said optical pump source is configured to longitudinally-pump or side-pump said gain medium.

134. The optical amplifier of any of the examples above wherein the optical pump source comprises a diode array or other lasers.

135. The optical amplifier of any of the examples above, wherein said gain medium comprises a single-crystal, ceramic, or glass host medium.

136. The optical amplifier of any of the examples above, wherein said gain medium is doped with one or more rare earth dopants or transition metal dopants, said dopants singly or in aggregate providing gain to said optical amplifier when pumped.

137. The optical amplifier of any of the examples above Example 136, wherein said dopant is selected from Ti, Nd, Er, Tm, Ho or Yb.

138. The optical amplifier of any of the examples above, wherein said optical amplifier includes ASE-absorbing edge cladding.

139. The optical amplifier of any of the Examples above, wherein said optics have an f/# in a range from 1.5 to 10, 140. The optical amplifier of any of the Examples above, wherein said optics have an f/# in a range from 2 to 5.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

What is claimed is:

1. An optical amplifier comprising:

first optics configured to receive a laser beam and output an expanding beam;

a gain medium comprising material configured to provide optical gain to laser light transmitted therethrough, said gain medium having an input surface and an output surface separated from each other in a longitudinal direction by a length, said input surface extending in first and second directions orthogonal to said longitudinal direction so as to have an input area, said output surface extending in said first and second directions orthogonal to said longitudinal direction so as to have an output area, said output area being larger in both said first and second directions than said input area, said gain medium being positioned such that said expanding beam is received into said input surface and output through said output surface, said expanding beam having a larger beam size in both said first and second directions at said output surface than at said input surface;

an optical pump source configured to provide output pump radiation to said gain medium such that said material provides optical gain to said expanding beam transmitted therethrough, and second optics positioned to receive the laser beam output from the gain medium and to reduce the divergence of said laser beam.

2. The optical amplifier of claim 1, wherein said gain medium comprises a frustum of said material configured to provide optical gain.

3. The optical amplifier of claim 1, wherein said gain medium does not comprise a waveguide.

4. The optical amplifier of claim 1, wherein said input surface, said output surface, or both are curved.

5. The optical amplifier of claim 1, wherein said material does not comprise an electrically-energized semiconductor.

6. The optical amplifier of claim 1, wherein said gain medium has a larger small-signal gain at said input surface than at said output surface.

7. The optical amplifier of claim 1, wherein said gain medium is doped with dopants so as to provide a higher average dopant level closer to said input surface than said output surface.

8. The optical amplifier of claim 1, wherein said gain medium is doped with dopants so as to provide on average a gradient in dopant level from said input surface to said output surface.

9. The optical amplifier of claim 1, wherein said laser beam in the gain medium has a constant fluence to within about ±50% along the longitudinal direction thereof.

10. The optical amplifier of claim 1, wherein said laser beam in the gain medium has a fluence within of about 1 to 2 times $F_{sat}$ or within ±50% thereof along the longitudinal direction thereof.

11. The optical amplifier of claim 1, wherein said first optics comprises a negative lens.

12. The optical amplifier of claim 1, wherein said second optics comprises a positive lens.

13. The optical amplifier of claim 1, wherein said second optics comprises a hyperbolic lens.

14. The optical amplifier of claim 1, wherein said pump radiation is introduced to said gain medium through said second optics.

15. The optical amplifier of claim 1, further comprising a dichroic reflector disposed in an optical path between said pump source and said gain medium such that said pump radiation is directed through said dichroic reflector to said gain medium and an amplified laser beam is reflected from said dichroic reflector toward an output of said optical amplifier.

16. The optical amplifier of claim 1, wherein said expanding laser beam and said pump radiation are counter-propagating through said gain medium.

17. The optical amplifier of claim 1, wherein said optical amplifier includes ASE-absorbing edge cladding.

18. The optical amplifier of claim 1, wherein said first optics has an f-number in a range from at least 1.5 to 10.

19. An optical amplifier comprising:

a gain medium comprising material configured to provide optical gain to laser light transmitted therethrough, said gain medium having an input surface and an output surface separated from each other in a longitudinal direction by a length, said input surface extending in first and second directions orthogonal to said longitudinal direction so as to have an input area, said output surface extending in said first and second directions orthogonal to said longitudinal direction so as to have an output area, said output area being larger in both said first and second directions than said input area, wherein said gain medium comprises a non-gaseous medium, and wherein said gain medium has a larger small-signal gain at said input surface than at said output surface.

20. The optical amplifier of claim 19, wherein the gain medium comprises a dielectric crystal comprising garnet, strontium fluoride, lithium fluoride, yttrium aluminum garnet (YAG), or yttrium lithium fluoride (YLF) or that the gain medium comprises ceramic.

* * * * *